United States Patent [19]

Beck

[11] Patent Number: 4,530,343
[45] Date of Patent: Jul. 23, 1985

[54] DISPOSABLE BARBEQUE ASSEMBLY

[76] Inventor: Paul Beck, 1100 N. Alta Loma Rd., Los Angeles, Calif. 90069

[21] Appl. No.: 614,128

[22] Filed: May 25, 1984

Related U.S. Application Data

[63] Continuation-in-part of Ser. No. 465,785, Feb. 11, 1983, abandoned.

[51] Int. Cl.³ .............................................. F24C 1/16
[52] U.S. Cl. .................................. 126/9 A; 126/9 B; 126/25 R
[58] Field of Search ............ 126/9 A, 9 R, 9 B, 25 R, 126/25 AA, 29, 30, 25 A; 220/94 R; 16/114 A, 114 R; 294/27.1, 34; 99/421

[56] References Cited

U.S. PATENT DOCUMENTS

| 850,983 | 4/1907 | Valiquette | 16/114 A |
| 1,227,920 | 5/1917 | Maaske | 294/27.1 |
| 1,487,737 | 3/1924 | Goldberg et al. | 126/9 B |
| 2,613,979 | 10/1952 | Stillabower | 294/34 |
| 2,780,215 | 2/1957 | Vacanti, Jr. | 126/9 R |
| 3,064,637 | 11/1962 | Thomson | 126/9 R |
| 3,146,773 | 9/1964 | Melzer | 126/9 R |
| 3,353,527 | 11/1967 | Anderson | 126/9 A |
| 3,682,154 | 8/1972 | Mollere | 126/9 A |
| 4,171,144 | 10/1979 | Rodriquez | 16/114 A |

FOREIGN PATENT DOCUMENTS

| 637883 | 3/1962 | Canada | 220/94 R |
| 107037 | 6/1917 | United Kingdom | 126/9 R |

Primary Examiner—James C. Yeung
Attorney, Agent, or Firm—Lyon & Lyon

[57] ABSTRACT

Disclosed herein is a disposable barbeque assembly comprising a collapsible frame, a grill adapted to be secured to the frame, a fuel pan adapted to be suspended from the frame at varying elevations below the grill and a supply of fuel adapted to be held within the pan.

6 Claims, 5 Drawing Figures

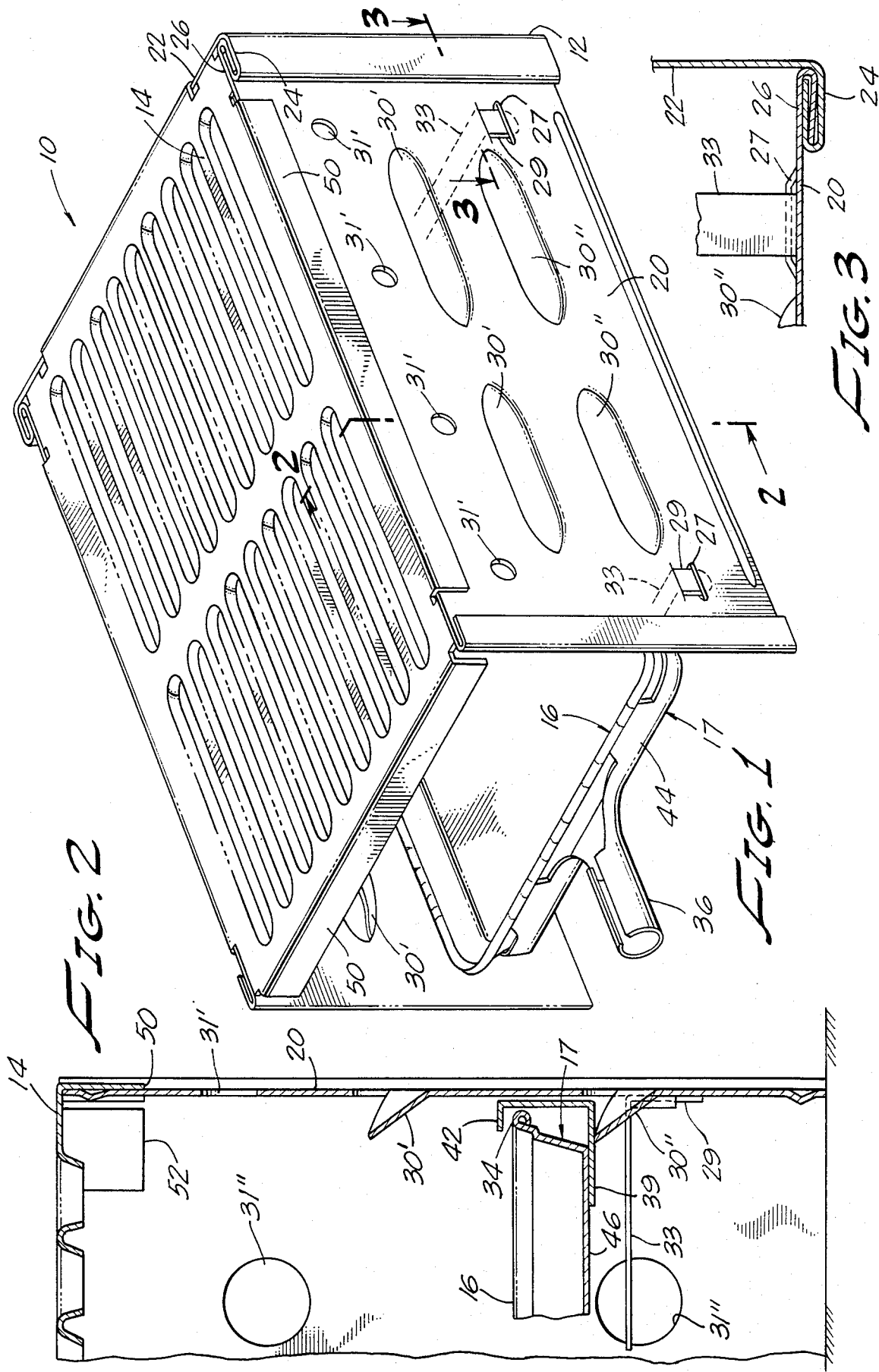

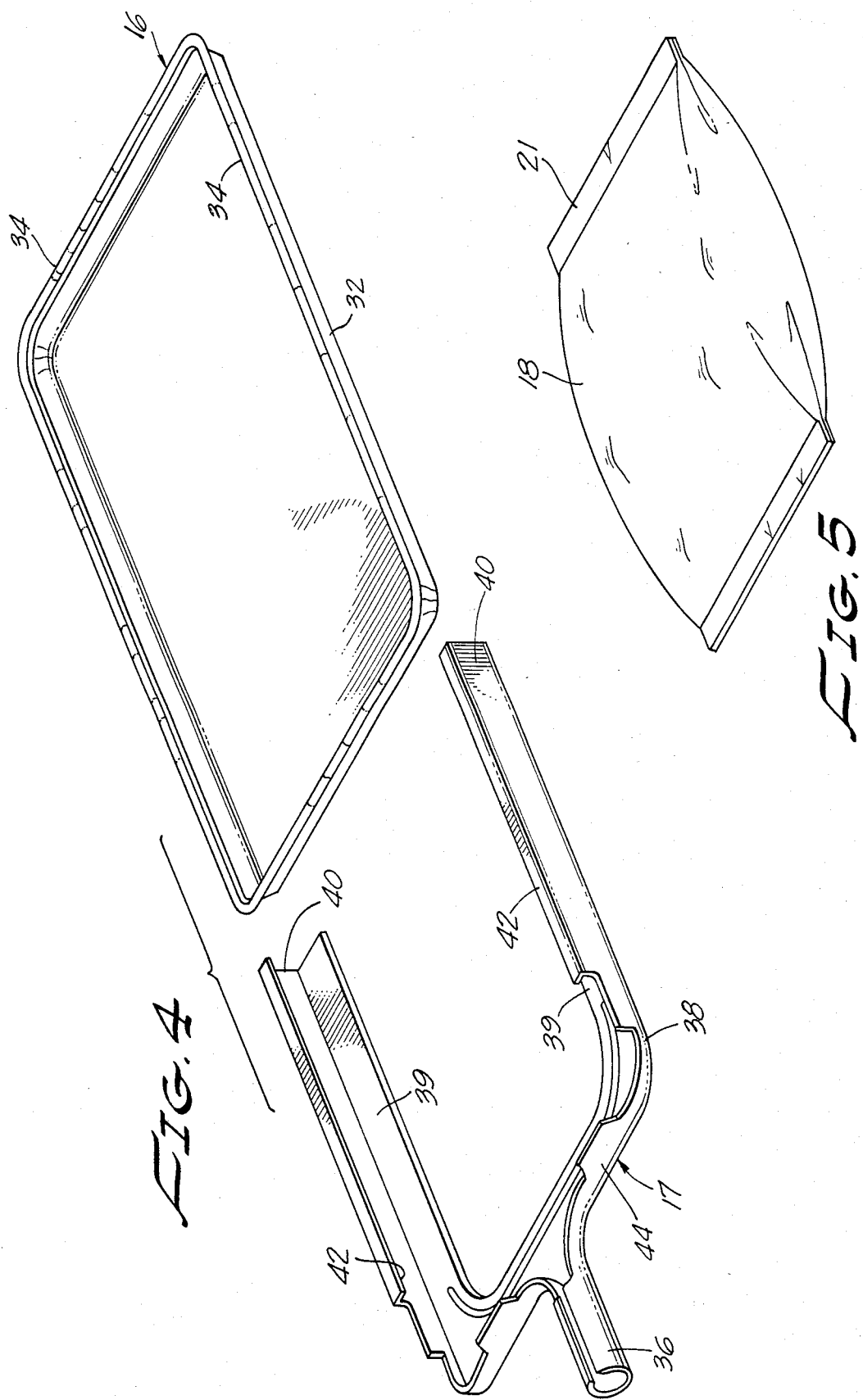

1

DISPOSABLE BARBEQUE ASSEMBLY

BACKGROUND OF THE INVENTION

This is a Continuation-In-Part of Ser. No. 465,785, filed Feb. 11, 1983 for Disposable Barbeque Assembly, abandoned.

Outdoor cooking with a barbeque enjoys ever-increasing popularity. Its only significant drawbacks, excluding inclement weather, are the awkward handling of frequently dirty equipment and cleanup. It is believed that the problems of grease, handling and disposing of ashes and partially consumed charcoal briquettes and having to clean a grill with chared foodstuffs adhering thereto have discouraged an even larger growth in the popularity of cooking out of doors with a barbeque. These problems become even more acute when using the barbeque as a portable cooking device, as for example, taking it on a picnic. If it were possible to obviate the need to handle the briquettes and clean out the barbeque before or after each use or after it became too full of ashes as well as having to clean the grill prior to each use, the popularity of barbeques undoubtedly would be enhanced. While for many people these problems have been largely alleviated by the use of propane fuel and simulated charcoal briquettes, such devices are relatively expensive, while others prefer to use the conventional charcoal-like briquettes as the combusting fuel which are commonly sold under numerous tradenames. In addition, gas fuel barbeques do not lend themselves to portable usage.

While some barbeque assemblies have been specifically designed for portable usage such as those taught in U.S. Pat. Nos. 2,780,215 and 3,064,637, they still require extensive cleaning before they can be taken apart and stored for subsequent usage. At least one attempt has been made to provide a disposable barbeque assembly which would obviate the problem of cleanup. See U.S. Pat. No. 3,682,154. The construction illustrated therein, however, while being sufficiently economical to render the assembly disposable, includes flammable material, provides no adjustability in cooking temperatures and fails to provide a safe and expedient manner for handling the hot coals after use. The barbeque assembly of the present invention solves the aforesaid problems of handling and cleanup, is readily portable and sufficiently inexpensive so as to be largely or totally disposable while still providing for cooking heat adjustments and both simple and safe handling of the fuel.

SUMMARY OF THE INVENTION

Briefly, the invention comprises a barbeque assembly which, depending on preference, is either totally or substantially disposable. The assembly is comprised of a light-weight collapsible frame which is adapted to support on the upper surface thereof a disposable grill and at varying elevations below said grill a disposable pan containing a supply of charcoal-like briquettes impregnated with a conventional low-grade petroleum distillate fuel.

It is the principal object of the present invention to provide an improved disposable barbeque assembly.

It is another object of the present invention to provide a barbeque assembly which obviates the need to clean the components thereof prior to or after use.

It is yet another object of the present invention to provide a barbeque assembly which is simple in construction and economical to manufacture.

It is still a further object of the present invention to provide a disposable barbeque assembly which minimizes the need for handling the briquette fuel prior to and after use.

It is yet another object of the present invention to provide a disposable barbeque assembly which is easy to assemble and use.

These and other objects and advantages of the present invention will become apparent from the following detailed description taken in conjunction with the accompanying drawings.

BRIEF DESCRIPTION OF THE DRAWINGS

FIG. 1 is a perspective view of the barbeque assembly of the present invention.

FIG. 2 is a sectional view taken along line 2—2 of FIG. 1 illustrating the louvered fuel pan support defined by the side panel of the frame.

FIG. 3 is a sectional view taken along line 3—3 of FIG. 1 illustrating the locking channel joining the side frame panel to the end frame panel.

FIG. 4 is an exploded view illustrating the fuel pan and fuel pan support assembly of the present invention.

FIG. 5 is a perspective view of a sealed bag of impregnated briquette fuel.

DESCRIPTION OF THE PREFERRED EMBODIMENT

Referring now in detail to the drawings, the barbeque assembly 10 of the present invention is comprised of a U-shaped collapsible frame 12, grill 14, an open briquette fuel pan 16, a pan support handle 17, and a supply of charcoal-like briquettes 18 impregnated with a conventional low-grade petroleum distillate fuel and sealed within an air-tight bag 21 to prevent evaporation of the fuel.

The frame 12 is preferably constructed of 26 gauge steel to withstand repeated use, if desired, and is comprised of a pair of side panels 20 and end panel 22. The lateral ends of end panel 22 defined vertical locking channels 24 which slightably mate with corresponding locking channels 26 defined by the rear ends of side panels 20 to provide a relatively ridged yet detachable frame 12 for the barbeque assembly 10. The locking channels are illustrated in FIG. 3, however, it is to be understood that other attachment means could be employed to secure the panels together to define the barbeque frame 12. One example is conventional hinges, although the above-described locking channels are more economical to construct and resist inward collapse of the side panels. Small inwardly disposed louvers 27 are provided in the lower portion of the side panels 20 to receive the end flanges 29 of a frame support bars 33 which transverse the frame 12 to provide additional support and rigidity for the frame.

The side panels 20 of frame 10 are each louvered to define a pair of inwardly disposed lateral horizontal briquette pan support surfaces 30' and 30" (see FIGS. 1 and 2) and side apertures 31' and 31" are disposed in the side and end panels 20 and 22 respectively to allow air flow to and from the briquettes during use.

The briquette fuel pan 16 is preferably constructed of aluminum, is of a rectangular configuration defining side walls 32 and a support flange 34 extending about the perimeter thereof for securement of the pan to the pan support handle 17.

The pan handle 17 as frame 12 is stamped from 26 gauge steel, is of integral construction and defines a handle portion 36 extending from a U-shaped pan support portion 38 defining a U-shaped horizontal support surface 39, upstanding side wall portions 40 which terminate inwardly in lateral pan retention flanges 42 and upstanding rear wall portions 44. The fuel pan 16 is easily secured to the pan handle support 17 by sliding the pan onto the pan support portion 38 of the pan handle support 17 such that the underside 46 of the pan 16 rests on the horizontal support surfaces 37, flanges 34 of the pan 16 are disposed under the lateral retention flanges 42 of support 17 and the rear portion 48 of the pan 16 abuts the rearward wall portions 44 of support 17. So disposed, the fuel pan 16 is safely secured to the pan handle support 17 so that the pan 16 can be supported by support 17 on either pair of the lateral pan support surfaces 30' or 30" defined by the side panels 20 of the frame 12.

The upper support surfaces 30' are used to position the coals closer to the foodstuffs on the grill, as for example, while cooking meats, while the lower support surfaces 30" are further removed from the grill and would be used for warming or cooking at lower temperatures.

The grill 14, due to its disposable nature, is stamped from an inexpensive metal of sufficient durability to withstand a single use and defines depending elongated flanges 50 and tabs 52 for securement thereof to the upper surfaces of the side panels 20 and end panel 22 of the frame 12. As shown in FIG. 1, the depending flanges 50 are outwardly disposed from tabs 52 such that upon inserting the grill 14 atop frame 12, the flanges 50 extend over and adjacent the upper portions of the side and end panels 20 and 22 while the tabs 50 extend inwardly adjacent the upper surfaces of the side and end panels of the frame thereby releasably securing the grill to the upper surface of the frame.

To use the disposable barbeque of the present invention, it is only necessary to assemble the U-shaped frame by slightably interlocking the channels 24 in the end panel 22 with channels 26 in the side panels 20 and places the frame in the upright position seen in FIG. 1. The grill is then secured to the upper surface of the frame by flanges 50 and tabs 52. The impregnated briquette fuel is removed from the air-tight protective bag 21, spread out in pan 16 and ignited. The pan is then placed at the desired cooking level on either of the support surfaces 30' or 30" depending on the desired proximity of the grill to the burning coals. After cooling, the pan, ashes and grill are discarded and the frame is collapsed and retained for further use with a new pan, grill and supply of impregnated briquettes which would be marketed as a complete package for use with the permanent frame. Due to the very low cost of the frame, however, the frame could also be discarded without appreciably affecting the overall cost of the assembly.

Various changes and modifications may be made in carrying out the present invention without departing from the spirit and scope thereof. Insofar as these changes and modifications are within the purview of the appended claims they are to be considered as part of the present invention.

I claim:

1. A U-shaped frame having a pair of side panels and an end panel, means for detachably securing said side panels to said end panel, a disposable grill adapted to be suppoted by said frame, a first pair of lateral support surfaces integrally formed with and defined by said side panels and extending inwardly of said frame with respect to said side panels, a fuel pan carrying member including a handle portion and a U-shaped pan support portion and defining a pair of lateral horizontal pan support surfaces, a transverse horizontal pan support surface spanning said lateral surfaces and wall portions extending upwardly from said lateral and transverse support surfaces for securing said pan on said member.

2. The combination of claim 1 including a second pair of lateral support surfaces defined by said side panels for supporting said pan, said second pair of lateral support surfaces being disposed below said first pair of lateral support surfaces and a supply of briquettes impregnated with a fuel.

3. The combination of claim 2 wherein said grill defines integrally therewith a plurality of depending flange portions and tab portions disposed about at least a portion of the perimeter of said grill, said flange portions being adapted to extend over and about portions of said side and end panels of said frame and said tab portions being inwardly spaced from said flange portions and being adapted to be disposed interiorly adjacent portions of said side and end panels of said frame for removably securing said grill to said frame.

4. The combination of claim 2 wherein said fuel comprises a low-grade petroleum distillate and including a substantially air-tight container disposed about briquettes for preventing evaporation of said fuel.

5. A collapsible frame comprised of a pair of side panels and an end panel, one end of each of said side panels and the ends of side end panel defining mating attachment means for detachably securing said side panels to said end panel in a U-shaped configuration, each of said side panels having a portion thereof bent inwardly therefrom to define a first pair of horizontal lateral pan support surfaces a disposable grill adapted to be supported by said frame above said first pair of support surfaces, a fuel pan carrying member including a handle portion and a U-shaped pan support portion integrally formed therewith and defining a pair of lateral horizontal pan support surfaces, a transverse horizontal pan support surface spanning said lateral surfaces and wall portions extending upwardly from said lateral and transverse support surfaces for securing said pan on said member, a plurality of briquettes impregnated with a liquid fuel and adapted to be carried by said fuel pan and a substantially air-tight container disposed about said briquettes.

6. The combination of claim 5 wherein said grill defines integrally therewith a plurality of depending flange portions and tab portions disposed about at least a portion of the perimeter of said grill, said flange portions being adapted to extend over and about portions of said side and end panels of said frame and said tab portions being inwardly spaced from said flange portions and being adapted to be disposed interiorly adjacent portions of said side and end panels of said frame for removably securing said grill to said frame.

* * * * *